US010449749B1

United States Patent
Calder et al.

(10) Patent No.: US 10,449,749 B1
(45) Date of Patent: Oct. 22, 2019

(54) THERMOPLASTIC AEROSTRUCTURE WITH LOCALIZED PLY ISOLATION AND METHOD FOR FORMING AEROSTRUCTURE

(71) Applicant: TRIUMPH AEROSTRUCTURES, LLC., Arlington, TX (US)

(72) Inventors: Mark A. Calder, Midlothian, TX (US); John F. Ellis, Carrollton, TX (US); William David Dennison, Grapevine, TX (US); Martin A. Wimmer, Colleyville, TX (US); Earl L. Stone, III, Arlington, TX (US)

(73) Assignee: TRIUMPH AEROSTRUCTURES, LLC., Arlington, TX (US)

( * ) Notice: Subject to any disclaimer, the term of this patent is extended or adjusted under 35 U.S.C. 154(b) by 0 days.

(21) Appl. No.: 16/402,780

(22) Filed: May 3, 2019

Related U.S. Application Data

(60) Provisional application No. 62/666,193, filed on May 3, 2018.

(51) Int. Cl.
  *B32B 5/26* (2006.01)
  *B64C 3/20* (2006.01)
  (Continued)

(52) U.S. Cl.
  CPC .................. *B32B 5/26* (2013.01); *B32B 3/30* (2013.01); *B32B 5/024* (2013.01); *B32B 37/06* (2013.01);
  (Continued)

(58) Field of Classification Search
  CPC ........... B32B 5/26; B32B 37/06; B32B 5/024; B32B 3/30; B32B 2262/106;
  (Continued)

(56) References Cited

U.S. PATENT DOCUMENTS

| 3,768,760 A | 10/1973 | Jensen |
| 4,871,412 A | 4/1989 | Hinson |

(Continued)

FOREIGN PATENT DOCUMENTS

| EP | 330722 | 8/1994 |
| EP | 1200308 | 4/2004 |

OTHER PUBLICATIONS

Worrall et al, "Novel Induction Heating Technique for Joining of Carbon Fibre Composites", paper presented at SEICO 14: 35th International Technical Conference & Forum "Low Cost Composite Processing, from Aerospace OOA to Automotive Thermoplastic", 2014, 6 pages.

(Continued)

*Primary Examiner* — Brian Handville
(74) *Attorney, Agent, or Firm* — Stephen H. Eland; Dann, Dorfman, Herrell & Skillman

(57) ABSTRACT

A composite wingbox structure formed of reinforced thermoplastic. The composite includes carbon fiber reinforcement and a plurality of insulation elements to localize the heat formed during the process of manufacturing the structure. The process of manufacturing the wingbox includes the steps of interleaving a series of insulations elements within a plurality of laminae and consolidating the insulation elements and laminae to form a laminate. The laminate is then aligned with a support structure such that the insulation elements overlie the supports structure. The laminate is then fused to the support structure using a non-contact heating process, such as inductive welding.

26 Claims, 3 Drawing Sheets

(51) Int. Cl.
    *B32B 3/30*     (2006.01)
    *B32B 5/02*     (2006.01)
    *B64C 3/26*     (2006.01)
    *B64C 3/18*     (2006.01)
    *B32B 37/06*     (2006.01)

(52) U.S. Cl.
    CPC .............. *B64C 3/185* (2013.01); *B64C 3/20* (2013.01); *B64C 3/26* (2013.01); *B32B 2260/046* (2013.01); *B32B 2262/106* (2013.01); *B32B 2605/18* (2013.01)

(58) Field of Classification Search
    CPC .......... B32B 2260/046; B32B 2605/18; B64C 3/185; B64C 3/20; B64C 3/26
    See application file for complete search history.

(56) References Cited

U.S. PATENT DOCUMENTS

| | | |
|---|---|---|
| 4,957,577 A * | 9/1990 | Huebner ................ B29C 65/08 156/197 |
| 5,059,377 A | 10/1991 | Ashton et al. |
| 5,421,935 A | 6/1995 | Dixon et al. |
| 5,934,617 A | 8/1999 | Rutherford |
| 6,194,685 B1 | 2/2001 | Rutherford |
| 6,237,874 B1 | 5/2001 | Rutherford et al. |
| 6,279,856 B1 | 8/2001 | Rutherford et al. |
| 6,284,347 B1 | 9/2001 | Green et al. |
| 6,330,986 B1 | 12/2001 | Rutherford et al. |
| 6,565,942 B2 | 5/2003 | Anderson et al. |
| 7,585,156 B2 | 9/2009 | Oldroyd |
| 9,227,732 B2 | 1/2016 | Stonestreet, II et al. |
| 9,840,043 B2 | 12/2017 | Schulte et al. |
| 2002/0168184 A1 | 11/2002 | Meisiek |
| 2011/0168324 A1 | 7/2011 | Ender |
| 2013/0034684 A1 | 2/2013 | Meyer et al. |
| 2016/0236406 A1 | 8/2016 | Schulte et al. |

OTHER PUBLICATIONS

Silvio Pappada, "Eco-design and manufacturing of thermoplastic structural fairing for helicopters" CETMA conference 2014, 25 pages.

International Search and Written Opinion issued in PCT/US19/30611 dated Sep. 4, 2019.

\* cited by examiner

THERMOPLASTIC AEROSTRUCTURE WITH LOCALIZED PLY ISOLATION AND METHOD FOR FORMING AEROSTRUCTURE

PRIORITY CLAIM

The present claims priority to U.S. Provisional Application No. 62/666,193 filed on May 3, 2018. The entire disclosure of the foregoing application is hereby incorporated herein by reference.

FIELD OF THE INVENTION

The present invention relates to the field of composite materials. In particular, the present application relates to structures formed of multiple components formed of composite materials. The present invention finds particular application to the field of aerostructures formed of multiple composite elements.

BACKGROUND

Composite materials have been used in a wide variety of applications in which the benefit of low weight high strength materials outweigh the cost of the materials. For instance, historically, aerostructures have been formed of lightweight metals, such as aluminum and more recently titanium. However, a substantial portion of modern aircraft is formed from composite materials. A commonly used material in the aerospace industry is carbon fiber reinforced thermoset plastic. Complex structures can be formed of such materials and once the structures cure, the shape is permanent. However, that advantage limits the ability to fuse the formed structure with a separate structure. Instead, the separate elements are connected using separate connectors, such as fasteners. Although structural elements formed of reinforced thermoplastic material may be connected without separate fasteners, the process of fusing the elements requires heating the components above a temperature that can cause damage to the structure. Accordingly, there is a need for an efficient process for connecting structural composite components without causing damage to the components.

SUMMARY OF THE INVENTION

In view of the foregoing, according to one aspect, the present invention provides a laminate structure that is configured to localize the heat produced during an induction welding process. In particular, the laminate is configured to localize the heat to a particular area of a particular ply (or plies) of a multilayer carbon fiber reinforced thermoplastic composite laminate. According to one aspect, the heat is localized to a particular area of a particular ply by incorporating multiple layers of insulating elements arranged in a pattern and embedded within the layers of the laminate. Optionally, the laminate may be incorporated into an aerostructure, such as a wingbox.

According to another aspect, the present invention provides a composite aerostructure having a plurality of longitudinally elongated spars and ribs interconnected to form a grid, wherein each of the spars and ribs comprises an upper element having a layer of unidirectional or woven carbon fiber reinforced thermoplastic material forming a weld zone. A composite skin is connected with the grid of spars and ribs. The laminate includes at least five plies of carbon fiber reinforced thermoplastic material. In the first ply the carbon fibers are oriented in a first direction. In the second ply the carbon fibers are oriented in the first direction and the first ply overlies and is directly connected to the second ply. The third ply has carbon fibers oriented in a second direction transverse the first direction and the fourth ply has carbon fibers are oriented in the second direction and the third ply overlies and is directly connected to the fourth ply. The fifth ply has carbon fibers oriented transverse the carbon fibers in the upper elements of the spars and the ribs. The laminate also includes a plurality of elongated insulating elements formed of electrically insulating material. The insulating elements each have a length and a width and at least a plurality of the insulating elements have a length that is substantially greater the width. The insulating elements form a grid configured substantially similarly to the grid formed by the ribs and spars so that the insulating elements overlie the upper elements of the spars and ribs. The grid of insulating elements is disposed between the second layer and the third layer. Optionally, each insulating element comprises glass fibers embedded within a matrix of thermoplastic material. Additionally, the insulating elements may comprise a plurality of elongated spar insulators overlying the spars and a plurality of elongated rib insulators overlying the ribs that are shorter than the spar insulators. The rib insulators may span between the spar insulators without substantially overlying the spar insulators. Further, the spar insulators may optionally be spaced apart from one another.

Optionally, the composite skin may include additional layers of carbon fiber reinforced thermoplastic material and the grid of insulating elements may form a first grid and the plurality of insulating elements forms a second grid configured substantially similarly to the first grid of insulating elements. The second grid may be disposed between the additional layers of carbon reinforced thermoplastic material so that the second grid is aligned with the first grid.

Additionally, the aerostructure may include a second composite skin connected with the grid of ribs and spars. Each spar and rib may include a lower element having a layer of unidirectional or woven carbon fiber reinforced thermoplastic material forming a lower weld zone and the second skin may be connected with the lower elements of the ribs and spars.

According to a further aspect, the present invention provides an aerostructure in which a plurality of insulating elements form a grid and the insulating elements may be arranged to form a plurality of openings.

According to another aspect, the present invention provides an aerostructure formed of thermoplastic comprising a semicrystalline thermoplastic in the polyaryletherketone family.

According to another aspect, the present invention provides an aerostructure formed of thermoplastic having a melting temperature above 500 degree Fahrenheit.

According to a further aspect, an aerostructure is provided in which a laminate includes insulating elements and structural layers and the insulating elements are configured such that thermoplastic of the structural plies are maintained below a melting temperature when the bottom layer is heated to a temperature above the melting temperature by an induction welding head.

According to still another aspect, an aerostructure is provided in which a laminate includes insulating elements and structural layers and the insulating elements are configured such that the thermoplastic of a bottom one of the structural layers has a melting temperature and the insulating elements are configured to impede heating of the structural layers other than the bottom layer above the melting temperature when the bottom layer is exposed to an electromagnetic field sufficient to raise a portion of the bottom laminate above the melting temperature.

Similarly, the present invention also provides an aerostructure having a laminate formed of a plurality of insulating elements embedded within a plurality of structural layers and a bottom layer, wherein the thermoplastic of the bottom layer has a melting point and the insulating elements are configured to prevent the thermoplastic of the structural layers from melting when the bottom layer is welded to separate aerostructures by induction welding.

According to a further aspect, the present invention provides a composite aerostructure formed of a plurality of longitudinally elongated spars, a plurality of elongated ribs connected with the plurality of spars to from a grid and a composite skin. The composite skin includes a plurality of structural layers, a plurality of insulating elements and a weld layer. The structural layers are each formed of unidirectional or woven carbon fiber reinforced thermoplastic material. The insulating elements are formed of electrically insulating material and they form a plurality of insulating grids wherein the insulating grids are aligned with one another and are disposed between the structural layers. The weld layer is also formed of unidirectional or woven carbon fiber reinforced thermoplastic material. The aerostructure also includes a plurality of connecting elements comprising a layer of unidirectional or woven fiber reinforced thermoplastic material. Each connecting element is connected with one of the spars or one of the ribs. Additionally, the carbon fibers of the weld layer are oriented in a first direction and the carbon fibers of the connecting elements are oriented in a second direction transverse the first direction. The weld layer overlies and is connected with the connecting elements.

Still further, the present invention provides a composite laminate for use in an aerostructure. The laminate includes a plurality of structural layers, a plurality of insulating elements and a weld layer. The structural layers are each formed of unidirectional or woven carbon fiber reinforced thermoplastic laminae and the fiber direction of at least some of the structural layers is transverse the fiber direction of an adjacent structural layer. The insulating elements are formed of electrically insulating material and they form a plurality of insulating grids. The insulating grids are aligned with one another and are embedded within the structural layers between adjacent structural layers in which the fiber direction of the carbon fiber is transverse. The weld layer may also be formed of unidirectional or woven carbon fiber reinforced thermoplastic lamina.

Further yet, the present invention provides a method for forming a composite wingbox. The method includes the steps of providing a plurality of spars, connecting a plurality of ribs with the plurality of spars and forming a composite skin. The composite skin includes a plurality of structural layers, a plurality of insulating layers and a weld layer. Each structural layer is formed of unidirectional or woven carbon fiber reinforced thermoplastic material. Each insulating layer is formed of a plurality of spaced apart electrically insulating elements. Each insulating element has a length and a width and the length is substantially longer than the width. The insulating layers are aligned with one another and are disposed between the structural layers. The insulating layers are configured so that the insulating elements overlie the spars and ribs when the composite skin overlies the spars and ribs. The weld layer is formed of unidirectional or woven carbon fiber reinforced thermoplastic material. The method includes the step of positioning the composite skin over the ribs and spars so that the layers of the composite skin overlie the ribs and spars. The composite skin is then welded to the ribs and spars. The step of welding comprises the step of conveying an induction welding head over the composite laminate adjacent the ribs and spars so the induction welding head imposes an electromagnetic field through the composite laminate so that weld layer is heated above the melting temperature of the thermoplastic in the weld layer while the insulating layers impede heating of the structural layers above the melting temperature of the thermoplastic.

Optionally, the method may include the step of connecting a plurality of connecting elements to the ribs and the spars. Each connecting element may include a layer of unidirectional or woven carbon fiber reinforced thermoplastic and the step of welding may comprise welding the weld layer with the connecting elements. Additionally, the carbon fibers of the weld layer may be oriented in a first direction and the carbon fibers of the connecting elements may be oriented in a second direction. The step of connecting a plurality of connectors may comprise connecting the connectors so that the second direction is transverse the first direction.

According to yet another aspect, the present invention provides a method that includes the step of providing a composite laminate having a plurality of insulating layers, which comprises the step of arranging the plurality of insulating elements into a grid.

According to a further aspect, the present invention provides a method that includes the step of providing a composite laminate having a plurality of insulating layers and the method comprises the step of arranging the plurality of insulating elements so that a plurality of openings is formed between the insulating elements.

According to a still further aspect, the present invention provides a method including the step of forming a composite skin, which includes the step of providing pairs of the structural layers wherein each layer of a pair of structural layers is adjacent to and directly connected to the other structural layer of the pair and the two layers in a pair are oriented so that the fibers in both layers are substantially parallel. Adjacent pairs of structural layers are oriented so that the fibers in one pair are transverse the fibers in the adjacent pair. Optionally, the method includes the step of providing insulating layers by interposing an insulating layer between the one pair and the adjacent pair. Additionally, an insulating layer may be interposed between each adjacent pair of structural layers.

Additionally, according to another aspect, a method is provided that includes a method for forming a composite laminate for an aerostructure. The method includes the steps of providing a plurality of structural layers, each formed of unidirectional or woven carbon fiber reinforced thermoplastic laminae and providing a plurality of insulating elements formed of electrically insulating material, wherein each insulating element has a length and a width and the length is substantially longer than the width. The method further includes the step of creating a plurality of insulating layers, wherein each layer is formed by the step of arranging the insulating elements in a pattern in which a plurality of the insulating elements are spaced apart from one another. The insulating layers are positioned between the structural layers by aligning the pattern in each isolation layer. The structural layers are arranged so that the bottom layer forms a weld layer. The method includes the step of consolidating the plurality of structural layers and the insulating layers by heating the layers and applying pressure to form a composite laminate with the insulating layers embedded within the structural layers. Optionally, the step of arranging comprises arranging a plurality of the insulating elements so that insulating elements span between the plurality of spaced apart insulating elements. Additionally, the step of arranging may comprise arranging the insulating elements so that there are gaps between separate ones of the insulating elements.

According to a further aspect, a method is provided that includes positioning a consolidated laminate over a connection layer of unidirectional or woven carbon fiber reinforced thermoplastic material so that the direction of fibers in a weld layer are transverse the fibers in the connection layer and the step of inducing an electromagnetic field through the thickness of the laminate and the connection layer to heat the weld layer and the connection layer sufficiently to weld the weld layer and connection layer together.

According to another aspect, a method is provided that includes the step of inducing an electromagnetic field by conveying an induction coil over a laminate following a pattern of insulation layers in the laminate.

Still further, the present invention provides a method that includes the step of inducing an electromagnetic field by concentrating an electromagnetic field within the width of a plurality of insulation elements. Optionally, a connection layer is rigidly connected with an aerostructure so that the step of inducing an electromagnetic field welds the laminate with the connection layer to fixedly connect the laminate with the aerostructure.

According to yet another aspect, a method is provided in which an aerostructure comprises a plurality of structural elements forming a pattern and the method comprises aligning the pattern of the structural elements with a pattern of insulating layers in a laminate. The insulating layer may be formed of insulating elements arranged into a grid. Optionally, the step of arranging the insulating elements in a pattern may comprise arranging the insulating elements so that a plurality of openings are formed between the insulating elements.

While the methods and apparatus are described herein by way of example for several embodiments and illustrative drawings, those skilled in the art will recognize that the inventive methods and apparatus for sorting items using a dynamically reconfigurable sorting array are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the methods and apparatus for sorting items using one or more dynamically reconfigurable sorting array defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
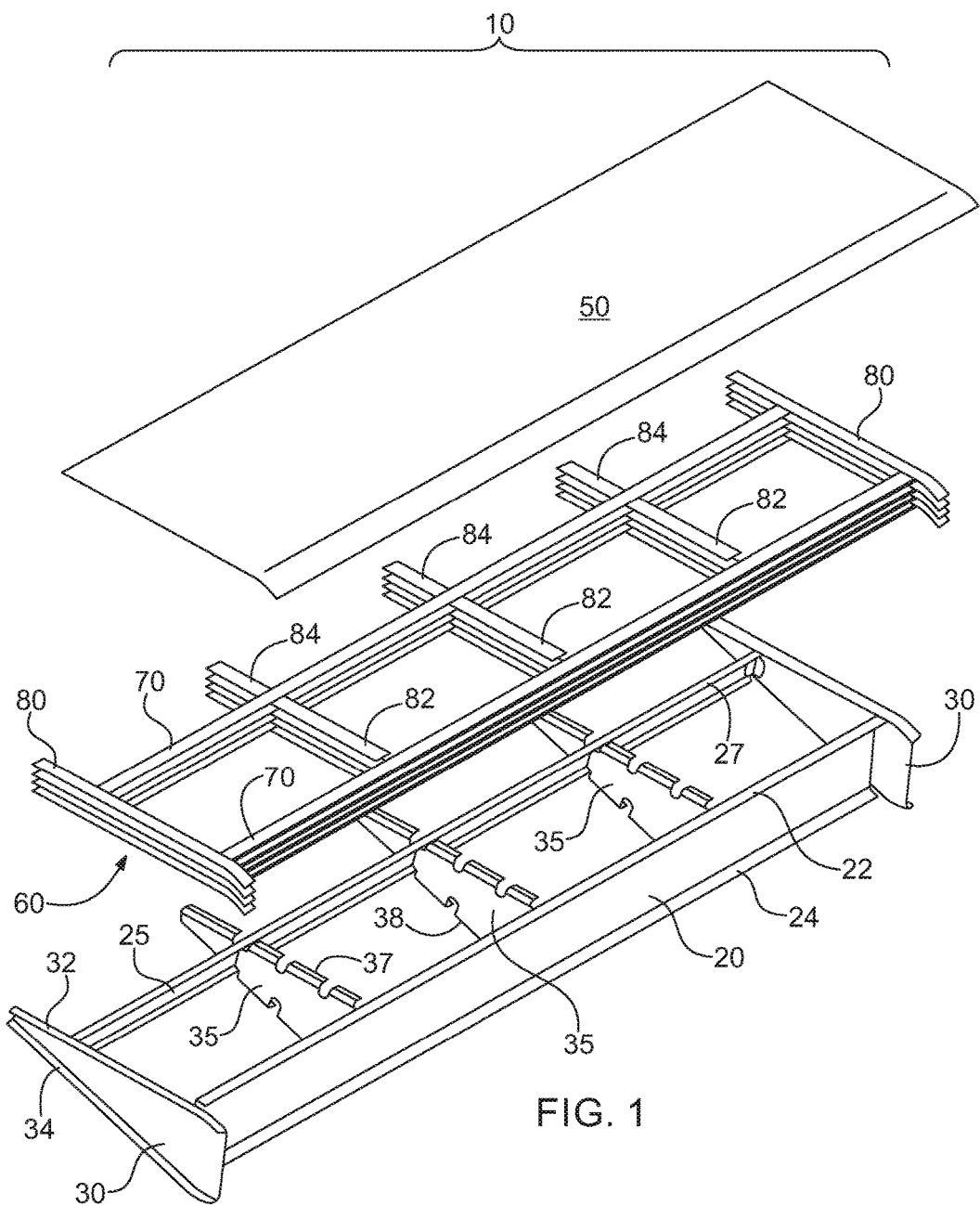
FIG. 1 is a perspective exploded view of a wingbox incorporating aspects of the present invention.

Referring now to the figures in general, and to FIG. 1 in particular, a composite aerostructure is designated generally 10. In the present instance, the aerostructure 10 is a wingbox having an upper skin 40 and a lower skin, which are both supported by a support structure 15. The upper and/or lower skin(s) are formed of a carbon fiber reinforced thermoplastic material. The composite skin includes insulating elements so the skin can by efficiently welded to the support structure without heating most of the skin, which can cause damage to the skin. In particular, the skin 40 is formed of a laminate that is configured to localize the heating effect produced by an induction welding head to limit the heating of the skin so that only a portion of the skin in a weld zone is heated to a welding temperature.

Referring to FIG. 1, the details of the aerostructure will be described in greater detail. In FIG. 1, the aerostructure incorporates a laminate into the structure of a wingbox. However, it should be understood that this is merely an exemplary structure; the laminate can be incorporated into a variety of composite structures. Additionally, although the laminate has particular application in an aerostructure, the laminate is not limited to use in an aerostructure.

Figure 3:
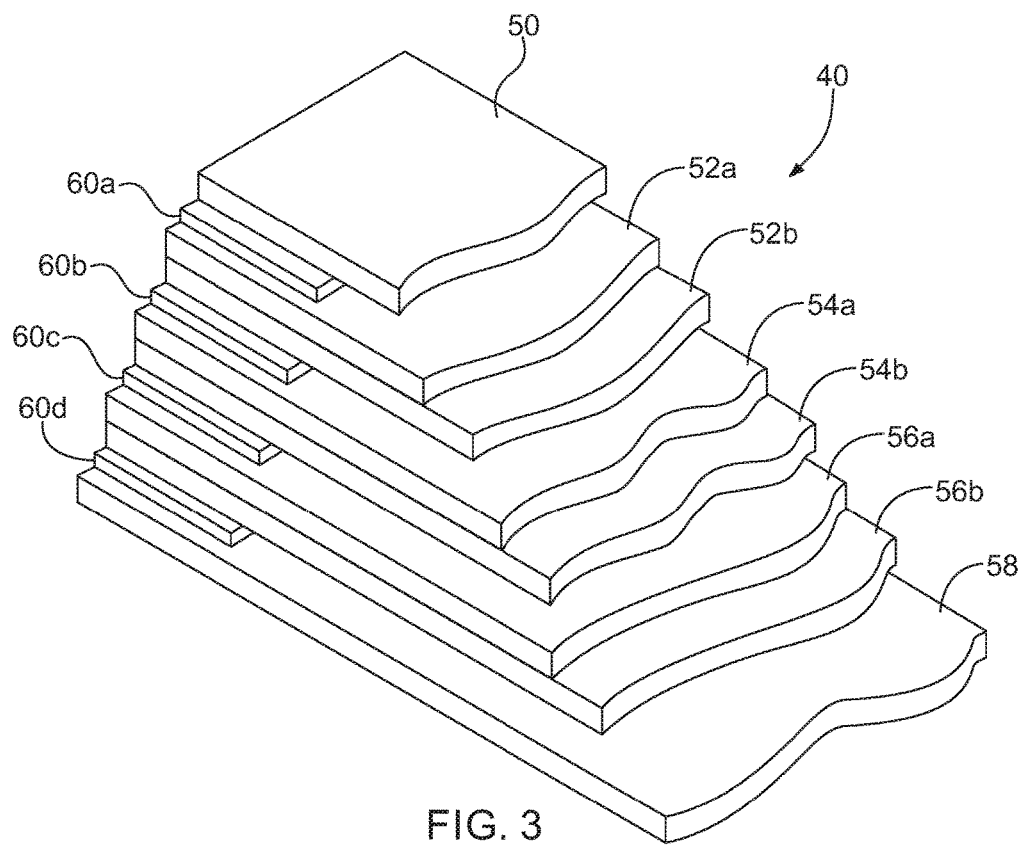
FIG. 3 is an enlarged perspective view of a portion of the wingbox of FIG. 1.

The aerostructure 10 in FIG. 1 is a wingbox that includes an underlying support structure 15 and a cover that overlies the support structure. In the present instance, the cover 40 is referred to as a skin and is shown in FIG. 3. For clarity, in FIG. 1 the skin is shown with structural layers separated from insulation layers, and only a single structural layer is shown (designated 50). Additionally, in FIG. 1 the assembly is illustrated with a single skin that overlies the top of the support structure. However, it should be understood that the assembly 10 may also include a lower skin covering the bottom of the support structure. The lower skin may be formed of a laminate similar to the laminate of the upper skin 40. Additionally, the top and or bottom skins may wrap around the front and or rear edge of the support structure to form an enclosed assembly.

The support structure 15 may be any of a variety of configurations depending on the application for the structure. In the present instance, the support structure 15 is formed of a plurality of elongated spars and ribs. A leading spar 20 extends across the length of the wingbox. A first end of the leading spar is connected with a first end rib 30 and a second end of the leading spar is connected with a second end rib 30 so that the leading spar spans the distance between the two end ribs. The end ribs 30 extend across the width of the wingbox and are transverse the leading spar 20. The leading spar 20 is an elongated beam having a central web having a height and a thickness, wherein the height is substantially greater than the thickness. The web of the leading spar may be incorporated into any of a variety of beam configurations, such as a box beam, channel beam or an I-beam. In the present instance, the spar may be a channel beam with the web spanning between an upper surface 22 and a lower surface 24. As described below, the upper and lower surfaces 22, 24 may form connection surfaces for connecting the skins 40 to the spars.

A trailing spar 25 spaced apart from the leading spar 20 is also connected with the two end ribs 30 so that the trailing spar spans the length between the end ribs. The trailing spar 25 may be configured substantially similarly to the leading spar. In the present instance, the trailing spar 25 is substantially similar to the leading spar except the trailing spar is shorter than the leading spar. In this way, the interconnected spars 20, 25 and end ribs 30 form the sides of a general box-shaped support structure 15. Additionally, the support structure 15 may include a plurality of additional elements to stiffen and/or strengthen the structure. For instance, the support structure 15 may include additional spars that extend across the length of the structure. In the present instance, the support structure 15 includes a plurality of intermediate ribs 35 that extend across the width of the support structure.

In the present embodiment, the height of the ribs 30, 35 taper to form a tapered wingbox. In particular, the height of the ribs 30, 35 adjacent the leading spar 20 is greater than the height of the ribs 30, 35 adjacent the trailing spar 25. The intermediate ribs 35 are spaced apart from the end ribs 30 and from one another. The ribs 30, 35 may be configured as elongated beams, similar to the spar 20, 25 as described above. In the present instance, the ribs 30, 35 are configured similar to channel beams, having a central web extending between transverse upper and lower legs. Additionally, similar to the spars, the upper and lower legs of the ribs 30, 35 may form surfaces that contact the skins 40 to provide connection points between the skins and the support structure 15. Specifically, the end ribs 30 may include upper and lower flanges 32, 34 that form contact surfaces and the intermediate ribs 35 may include upper and lower flanges 37, 38 that form contact surfaces.

Figure 4:
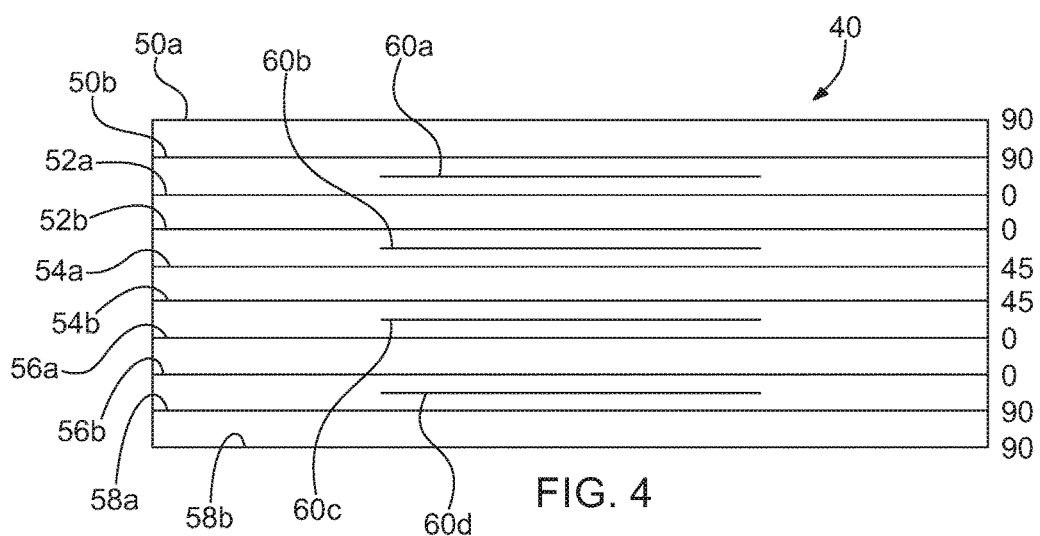
FIG. 4 is a schematic side view of the portion of the wingbox illustrated in FIG. 3.

Referring now to FIGS. 1 and 3-4, the details of the laminate forming the skin 40 will be described in greater detail. The laminate includes a plurality of structural layers 50, 52, 54, 56, 58 with a plurality of insulating elements 60 embedded between one or more structural layers. Each structural layer comprises reinforcing elements embedded within a matrix material. Depending upon the application, the reinforcing elements may be any of a variety of reinforcing materials. By way of example, the reinforcing elements may be elongated strands or fibers of glass or carbon. For instance, an exemplary carbon fiber is a continuous, high strength, high strain, PAN based fiber in tows of 3,00 to 12,000. These reinforcing fibers may be treated with a surface treatment and may be sized to improve its interlaminar shear properties with the matrix material. However, it should be understood that these materials are intended as exemplary materials; other materials can be utilized depending on the environment in which the laminate is to be used.

The reinforcing elements are embedded within a matrix material, such as a polymer. Depending on the application, any of a variety of polymers can be used for the matrix material, including amorphous, crystalline and semi-crystalline polymers. In the present instance, the matrix material is a thermoplastic material, such as a thermoplastic elastomer. More specifically, the thermoplastic material is a semi-crystalline thermoplastic. In particular, the thermoplastic may be a thermoplastic polymer in the polyaryletherketone (PAEK) family, including, but not limited to polyetheretherketone (PEEK) and polyetherketoneketone (PEKK).

As noted above, the structural layers 50, 52, 54, 56, 58 may be composite materials, which may be carbon fiber reinforced thermoplastic composites. In particular, the lamina may be thermoplastic prepregs, which are laminae in which the reinforcement materials have been pre-impregnated with resin. For instance, the prepreg may be thermoplastic prepregs produced by coating reinforcement fibers with a thermoplastic matrix. Such a prepreg lamina has the ability to be reheated and reformed by heating the lamina above the melting point of the thermoplastic matrix. Several exemplary prepreg materials that may be used to form the structural elements 25, 26 include, but are not limited to, materials produced by TenCate Advanced Composites USA of Morgan Hill, Calif. and sold under the name CETEX, such as TC1200, TC1225 and TC1320. TC1200 is a carbon fiber reinforced semi-crystalline PEEK composite having a glass transition temperature ($T_g$) of 143° C./289° F. and a melting temperature ($T_m$) of 343° C./649° F. TC1225 is a carbon fiber reinforced semi-crystalline PAEK composite having a $T_g$ of 147° C./297° F. and a $T_m$ of 305° C./581° F. TC1320 is a carbon fiber reinforced semi-crystalline PEKK composite having a $T_g$ of 150° C./318° F. and a $T_m$ of 337° C./639° F.

Referring again to FIG. 1, the laminate 40 comprises a plurality of structural layers configured to carry the structural load. A plurality of insulation layers 60 are embedded within the structural layers. Although the insulation layers may be configured to carry structural load, in the present instance, the insulation layers are configured to isolate the heating of the laminate during welding without carrying significant, if any, structural load. To illustrate the details of the insulation layers 60, in FIG. 1, the insulation layers 60 are shown separately from the structural layers of the laminate, along with a single structural layer 50 of the laminate. In the embodiment illustrated in FIG. 1, a plurality of aligned and overlapping insulation layers 60 are illustrated, however, it should be understood that the number and location of the insulation layers may vary depending upon the application.

The insulation layers 60 are embedded within a matrix material. Preferably, the matrix material is a thermoplastic material that can be heat fused with the other layers in the laminate. By heat fusing the matrix material of the insulation layer the insulation layer is integrally formed with the laminate. In particular, in the present instance, the insulation layers are formed of a composite material having a matrix that is substantially similar to the matrix material of the structural layers. For instance, the resistive elements are carbon fibers and the matrix material is a thermoplastic material, such as a semi-crystalline thermoplastic in the polyaryletherketone (PAEK) family.

The insulation layers 60 provide electrical insulation between the portions of the structural layers when an electromagnetic field is applied to the laminate adjacent the insulation layers 50. The insulation layers 60 may comprise any of a variety of electrically insulative materials. Preferably, the insulation layers 60 comprise a thermoplastic material. In the present instance, the insulation layer comprises one or more lamina of glass reinforced thermoplastic.

The insulation layers 60 are configured to isolate the heat from a heating process to a particular zone or area of the laminate. It should be understood that although the isolation layers 60 limit the heating of the structural layers, the insulation layers do not limit the heating by providing significant thermal insulation. Instead, the insulation layers provide electrical insulation to selectively isolate different areas from being heated by inductive heating.

For instance, during a process in which the skin 40 is welded onto the support structure 15 the insulation layers limit the heat created during the welding process so that only a select ply or plies of the laminate are heated and only in certain areas of the select ply or plies. Accordingly, the insulation layers 60 are configured to form a pattern that corresponds to the portions of the laminate intended to be heated. Specifically, the insulation layers may be configured to form a pattern that corresponds to the portions of the laminate intended to be welded. In particular, the pattern may correspond to the areas of the laminate that contact the part to which the laminate is to be welded. For example, the insulation layer 60 may be formed to correspond to the pattern formed by the upper surfaces of the spars 20, 25 and the ribs 30, 35 (e.g. upper surfaces 22, 27, 32 and 37).

Each insulation layer 60 may be formed of a single piece of insulating material configured in the desired pattern. In some instances, the pattern may be a solid pattern so that the insulating material simply forms a block, stripe or similar pattern. However, in the present instance, the insulation layer 60 forms a pattern having a plurality of openings so that the insulation layer 60 overlies less than a majority of the area of the laminate. In some instance, the insulation may form a pattern having sufficient open areas so that the insulation overlies less than 40% of the overall area of the laminate. Further still, in some applications the insulation layer may form a pattern having sufficient open areas so that the insulation overlies less than 30% of the overall area of the laminate. Additionally, in some applications it may be desirable to configure the insulation layer to have sufficient open areas so that the insulation overlies less than 20% of the overall area of the laminate. Further, the insulation layer in the illustrated structure forms a pattern that covers at least approximately 5% of the overall area of the laminate.

Referring again to FIG. 1, in the present instance, the insulation layer 60 forms a grid pattern of a plurality of intersecting stripes of insulating material. Specifically, the insulation layer 60 is formed of a plurality of elongated insulation elements having a length and a width, wherein the length in significantly greater than the width. An exemplary material for forming the insulation elements is a tape of glass fibers embedded in thermoplastic material. A first group of insulating elements form spar insulation elements 70 that extend at least substantially the entire length of the spars 20, 25. As shown in FIG. 1, the spar insulation elements 70 are laid out so that a first spar insulation element overlies the upper surface 22 of the leading spar 20 and a second spar insulation element 70 overlies the upper surface 27 of the trailing spar 25. A pair of end rib insulating elements 80 are laid out adjacent the ends of the trailing spars so that the end rib insulating elements overlie the upper surfaces 32 of the end ribs. Similarly, a plurality of insulating elements 82 extend between the spar insulation elements 72 to overlie the intermediate ribs 35. As can be seen, the ribs 30, 35 extend rearwardly beyond the trailing spar 25. Therefore, the intermediate rib insulation elements may extend over the spar insulation element 70 overlying the trailing spar 25. In this way, the rib insulation element 82 and the spar insulation element 70 would overlap to form an insulation element having a two-ply thickness. However, in the present instance, the insulation elements of the insulation layer do not substantially overlap so substantially the entire insulation layer is a single layer thick. Accordingly, to prevent substantial overlap of insulation elements, the intermediate rib insulation elements are formed into two segments: a first segment 82 extends over the intermediate spars and spans between the spar insulation elements 70; and a second segment 84 extends over the trailing end of the intermediate ribs 35 so that the second segments extend away from the spar insulation element 70 that overlies the trailing spar.

As can be seen by the foregoing, the insulation layer 60 forms a pattern having a plurality of open areas. In particular, the insulation layer forms a pattern that forms a grid to connect the laminate 40 with the top of the ribs and spars.

In some applications, it may be desirable to vary the pattern or size of the different insulation layers so that different insulation layers isolate different plies of the laminate. However, in the present instance, each of the insulation layers 60 is substantially similar. Specifically, each insulation layer 60 has a similar size and pattern. Additionally, as shown in FIG. 1, each of the insulation layers 60 in the laminate are aligned so that the insulation elements forming the pattern for each layer overlie the corresponding elements in the other insulation layers.

As discussed above, each of the structural layers 50, 52, 54, 56, 58 and the insulative layers 60 may comprise layers of reinforced thermoplastic composite materials. Accordingly, the structural layers and the insulation layer can be integrally connected by fusing the layers. Specifically, the layers may be consolidated by applying sufficient heat to raise the layers above the melting point of the thermoplastic matrix and applying sufficient pressure to fuse the layers together. In this way, the insulation layers 60 are embedded within the laminate between the structural layers.

The number of structural plies and the orientation of the plies in the laminate may vary depending on the application. Additionally, the orientation of the plies and the positioning of the insulation layers may be varied depending on the desired heat isolation. FIGS. 3 and 4 illustrate an exemplary layup of the laminate 40. However, it should be understood that the number of plies, the orientation of the plies, as well as the number and location of the insulating layers 60 are only an example; the invention is not limited to the lay-up illustrated in this exemplary laminate.

The laminate includes ten structural layers designated 50a,b, 52a,b, 54a,b, 56a,b, and 58a,b. As described above, each structural layer may be a lamina or layer of composite material, such as unidirectional or woven carbon fiber reinforced thermoplastic tape. The fiber direction for each structural layer may vary to provide strength in a plurality of directions. However, in the present instance, the layers may be laid up in pairs, wherein the fiber direction in both layers in the pair is parallel. For instance, the first layer in the laminate is designated 50a and has a fiber direction of 90° and the second layer in the laminate (designated 50b) also has a fiber angle of 90°. These first two layers 50a, 50b form a pair that are adjacent one another and attached to one another. The third and fourth structural layers comprise the second pair of layers 52a, 52b. Each layer of this second pair has a fiber direction of 0°. The fifth and sixth structural layers comprise the third pair of layers 54a, 54b. Each layer of the third pair has a fiber direction of 45°. The seventh and eighth structural layers comprise the fourth pair of layers 56a, 56b. The laminate may be formed so that it is symmetric about its midline, which in the present instance is the third pair of layers. Accordingly, the fourth pair of structural layers 56a, 56b may have a fiber direction that is similar to the fiber direction of the second pair of structural layers (e.g. 0°). Similarly, the ninth and tenth layer form the fifth pair and each layer of the fifth pair may have a fiber direction of 90°. It should be noted that the layers do not need to be laid up in pairs. For instance, as shown in FIG. 4 the layers are laid up in pairs. However, in FIG. 3 the top and bottom layers 52, 58 are laid up as single layers, while the six plies between the top and bottom layers are laid up in pairs.

The insulation layers 60 are selectively inserted between structural layers of the laminate. Although insulation layers may be inserted between each layer of the laminate, in the present instance, the insulation layers are inserted between less than all the structural layers. In particular, the insulation layers are inserted between layers having a select characteristic. For example, in the present instance, the select characteristic is a change in fiber direction. An insulation layer 60 is inserted between adjacent layers having different fiber angle. Accordingly, in the lay-up described above, the insulating layers 60 are interposed between the pairs of structural layers but not with in the layers in the pair. More specifically, referring to FIGS. 3-4, the first insulating layer 60a is positioned between layer 50 (in FIG. 3) or 50b (in FIG. 4) and layer 52a because the interface between layer 50/50b and layer 52a is an interface in which the fibers in adjacent layers are transverse one another (i.e. the fiber angle changes from 90° to 0°). Similarly, the second insulating layer 60b is positioned between layer 52b and layer 54a because the fiber angle changes from 0° to 45°. The third insulating layer 60c is positioned between the third and fourth pairs (i.e. the interface of layers 54b and 56a) where the fiber angle changes from 45° to 0°. The fourth insulating layer 60d is position between the fourth and fifth pairs (i.e. the interface of layers 56b and 58a or layer 58 in FIG. 3) where the fiber angle changes from 0° to 90°.

Figure 2:
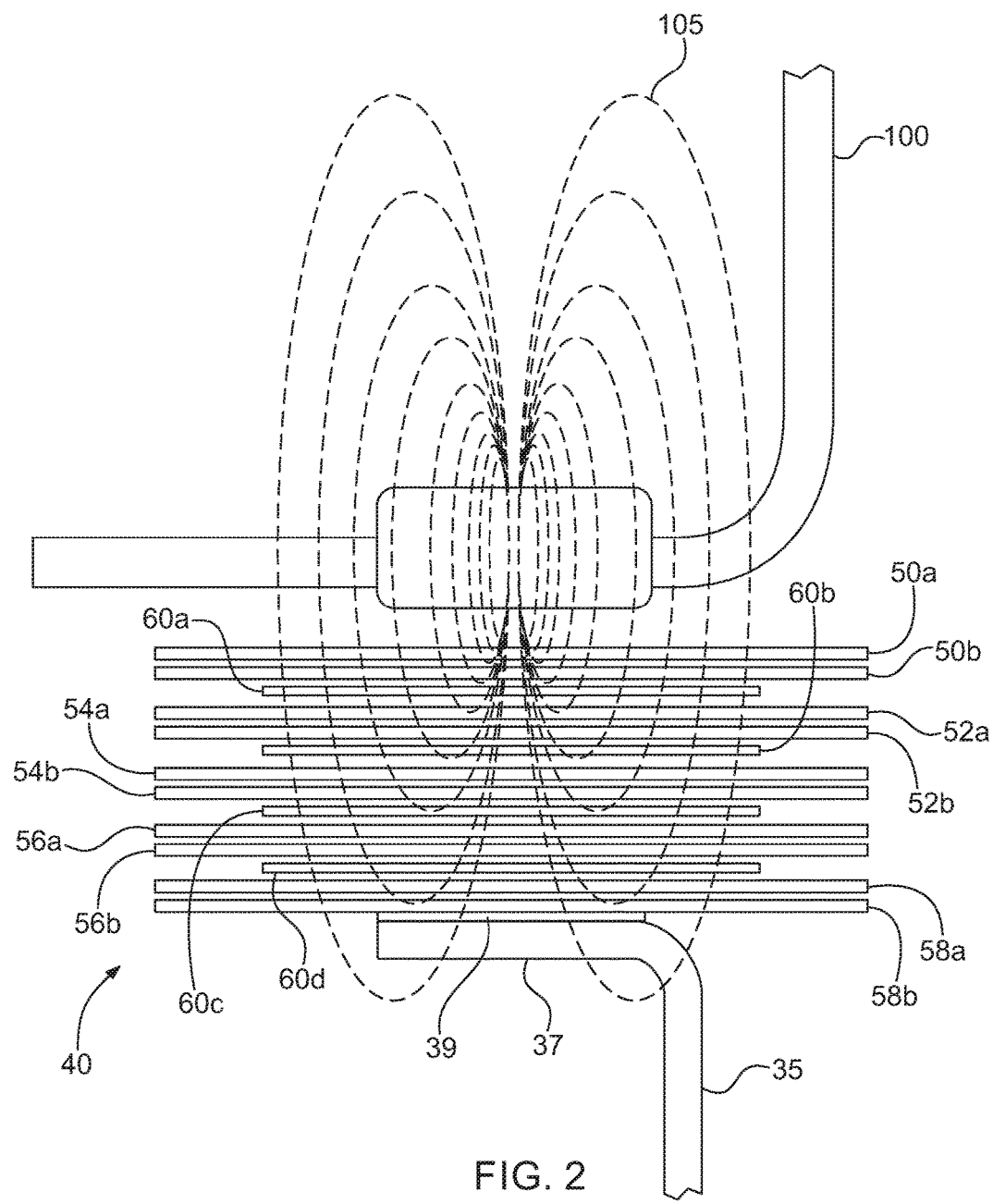
FIG. 2 is a diagrammatic view of a system for forming the wingbox of FIG. 1.

It should be noted that the thickness of the layers in the Figures are not to scale and in some instances the thickness is exaggerated for illustration purposes only. For instance, in FIG. 2, the structural layers 50, 52, 54, 56, 58 and the insulating layers 60 are depicted as having gaps between adjacent layers. However, it should be understood that the layers in the laminate are consolidated layers in which the different layers have been fused together. Further still, as noted above, each insulation layer 60 is described as a single layer of insulating material formed of one or more insulating element. However, it may be desirable in certain application to increase one or more of the insulation layers so that the insulation layer(s) may be formed of multiple layers of insulating material. Additionally, as shown in FIG. 2, the insulating layer 60 may not be a continuous layer extending the entire length and width of the laminate as shown in FIG. 1. Instead, the insulating layer 60 may cover only a small portion of the area of the structural layers.

The laminate 40 may be formed using a variety of processes. The details of a method of forming the laminate 40 from a plurality of reinforced thermoplastic layers will now be described. Additionally, the method of forming an aerostructure using the laminate will also be described.

A plurality of layers of carbon fiber reinforced thermoplastic tape are laid over top of one another to form a plurality of plies that are structural layers. The fiber orientation in the plies may be varied and insulating plies may be positioned in the interface of plies having transverse fiber orientations. For example, the layers may be formed of ten structural plies and 4 insulating layers oriented at 90°, 90°, Ins, 0°, 0°, Ins, 45°, 45°, Ins, 0°, 0°, Ins, 90°, 90° (wherein "Ins" refers to an insulating layer). The insulating layers are formed of one or more insulating elements forming a pattern. The insulating layers may be aligned through the thickness of the laminate so that the pattern of each insulating layer overlies the pattern of the other insulating layers in the laminate. In this exemplary laminate, the carbon fiber layers of the structural layers are formed of PEEK/AS4 carbon fiber reinforced unidirectional tape and the insulation layers are formed of PEEK/S2 fiberglass reinforced thermoplastic unidirectional tape.

The structural layers and insulating layers are consolidated to form a laminate by heating the assembled plies under pressure. For instance, the assembly may be heated up to a temperature above the melting temperature. In the present instance, the assembled layers are heated to approximately 725° under a pressure of approximately 30 psi. After the assembled layers reached 725°, the pressure is raised to approximately 100 psi and the assembly is maintained at the elevated temperature for an extended time, such as approximately 30 minutes. The pressure is then removed and the consolidated laminate is cooled to ambient temperature.

Formed as described above, the laminate may be connected with one or more separate elements to form as structure. One exemplary structure is an aerostructure. More specifically, the laminate is configured so that the laminate can be welded to a separate structure. Further still, the laminate is constructed so that the heat generated during the welding process is isolated to a select ply or plies of the laminate. Additionally, the heat generated may be isolated to select areas of the select ply. The process of welding the laminate with a separate element will now be described in greater detail.

As described above, the laminate is formed with one or more insulating layers. The insulating layer(s) may be formed according to a pattern. In particular, the pattern may be similar to the contact area of the separate element or assembly that is to be welded to the laminate. For instance, referring to FIG. 1, the insulating layer may form a grid that is shaped similarly to the grid formed by the ribs 30, 35 and spars 20, 25 of the support structure 15. Accordingly, the method includes the step of aligning the pattern of the insulating layer(s) with the grid formed by the ribs and spars. Referring to FIG. 2, the upper surface of the support structure comprises one or more connecting elements for welding the support structure to the laminate. In particular, the ribs 30, 35 and spars 20, 25 may be formed so that the upper surface 22, 27, 32, 37 form connecting elements. Alternatively, the connecting elements may be separate elements that are fixedly connected with the ribs and spars.

In the illustrated embodiment, the connecting element is a ply of carbon fiber reinforced thermoplastic material similar to the material forming the structural plies of the laminate 40. In FIG. 2, the connecting element is designated 39 and is illustrated as a laminate fixedly connected to the top of the flange 37 of intermediate rib 35. However, it should be understood that the connecting element may be an integral part of the underlying structure. For instance, the ribs 35 may be formed so that the flange 37 is formed of carbon fiber reinforced thermoplastic material that would operate as the connecting element. Alternatively, the connecting element may be a separate element that is mechanically fastened, such as by a clip or a fastener.

The fiber direction of the carbon fibers in the connecting element 39 may be oriented in a direction that is transverse the fiber direction of the bottom ply 58b of the laminate. The laminate 40 is placed over the structure so that bottom layer 58b contacts the connecting element(s) 39, with the insulating layers 60a,b,c,d aligned with the connecting elements. An induction welding head 100 is then brought into operative engagement with the laminate to induce an electromagnetic field through the thickness of the laminate. In particular, the induction welding head 100 travels over the top surface of the laminate. The weld head need not contact the upper surface; however, the weld head is sufficiently close to the top surface of the laminate to induce an electromagnetic field through the thickness of the laminate having sufficient strength to weld the bottom layer 58a and the connecting element 39.

The weld head 100 heats the bottom layer and the connecting element by electromagnetic induction, through heat generated by eddy currents. The weld head includes an electronic oscillator that passes a high-frequency alternating current through an electromagnet. The rapidly alternating magnetic field then penetrates the laminate and connecting element to generate the eddy currents which in turn heat the bottom layer and connecting element.

In the present instance, the weld head induces an electromagnetic field through the laminate and the connecting elements, so that the adjacent layers having transverse carbon fibers heat up in response to the electromagnetic field. However, layers that are separated by the insulating layers 60 do not heat above the melting temperature in response to the electromagnetic field. In particular, in the present instance, the electromagnetic field produced by the weld head is sufficient to heat the bottom layer 58*a* and the connecting element 39 above the melting temperature of the thermoplastic matrix material for the bottom layer and the connecting element. After raising the bottom layer and the connecting element above the melting layer while applying pressure, the bottom layer fuses with the connecting element to weld the two items together. Additionally, as noted above, the insulating layers 60 insulate the adjacent layers from the inductive heat caused by the weld head. In particular, it is to be noted that some of the electromagnetic field may extend beyond the edges of the insulating elements of the insulating layer. Accordingly, the electromagnetic field may induce some heating in the structural plies. However, the induced heating will be substantially lower than the heating induced between the non-insulated layers (i.e. 58*b* and 39) and will be substantially below the melting point of the structural layers. In this way, the insulating layers limit the heating of the structural layers to below the melting temperature while allowing the bottom layer and the connecting element to be heated above the melting temperature. Therefore, although the insulating layers do not necessarily prevent all heating of the layers adjacent the insulating layers, for purposes of this methodology, the insulating layers prevent the heating of the layers if the insulating layers limit the heating of the layers to substantially below the melting point.

In FIG. 2 the weld head 100 is shown as inducing an electromagnetic field through the laminate to weld the laminate to the rib 35. The method includes the step of controlling the travel of the weld head so that the weld head is conveyed over the laminate to weld a plurality of points of the laminate to the support structure 15. In particular, the method may include the step of controlling the position of the weld head to follow the pattern formed by the insulating layer. In this way, the weld head welds the laminate to the support structure along the areas corresponding with the pattern formed by the insulating layer 60.

In the foregoing description, the laminate is described as a flat panel laminate. However, it should be understood that the invention is not limited to flat panel structures. For instance, the laminate may be used in a variety of structures in a variety of fields and may have particular application in the field of aerospace to provide a variety of components, including, but not limited to airframes, nacelles and airfoils, such as wings, elevators etc. The laminate 40 described above may be formed into a curved structure and connected with a separate element or structure.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

The invention claimed is:

1. A composite aerostructure, comprising:
    a plurality of longitudinally elongated spars, each of which comprises an upper element having a layer of unidirectional or woven carbon fiber reinforced thermoplastic material forming a weld zone; and
    a plurality of elongated ribs interconnected with the plurality of spars to from a grid, wherein each rib comprises an upper element having a layer of unidirectional or woven carbon fiber reinforced thermoplastic material forming a weld zone;
    a composite skin connected with the grid of spars and ribs, comprising:
        a first ply of carbon fiber reinforced thermoplastic material, wherein the carbon fibers are oriented in a first direction;
        a second ply of carbon fiber reinforced thermoplastic material, wherein the carbon fibers are oriented in the first direction and the first ply overlies and is directly connected to the second ply;
        a third ply of carbon fiber reinforced thermoplastic material, wherein the carbon fibers are oriented in a second direction transverse the first direction;
        a fourth ply of carbon fiber reinforced thermoplastic material, wherein the carbon fibers are oriented in the second direction and the third ply overlies and is directly connected to the fourth ply;
        a fifth ply of carbon fiber reinforced thermoplastic material, wherein the carbon fibers are oriented transverse the carbon fibers in the upper elements of the spars and the ribs;
        a plurality of elongated insulating elements formed of electrically insulating material, wherein the insulating elements each have a length and a width and at least a plurality of the insulating elements have a length that is substantially greater the width; and wherein the insulating elements form a grid configured substantially similarly to the grid formed by the ribs and spars so that the insulating elements overlie the upper elements of the spars and ribs, wherein the grid of insulating elements is disposed between the second layer and the third layer.

2. The aerostructure of claim 1 wherein the first, second, third, fourth and fifth plies are unidirectional carbon fiber reinforced thermoplastic material.

3. The aerostructure of claim 1 wherein the composite skin comprises additional layers of carbon fiber reinforced thermoplastic material and wherein the grid of insulating elements is a first grid and the plurality of insulating elements forms a second grid configured substantially similarly to the first grid of insulating elements, wherein the second grid is disposed between the additional layers of carbon reinforced thermoplastic material so that the second grid is aligned with the first grid.

4. The aerostructure of claim 3 wherein each insulating element comprises glass fibers embedded within a matrix of thermoplastic material and the aerostructure comprises a second composite skin connected with the grid of ribs and spars.

5. The aerostructure of claim 4 wherein each spar and rib comprises a lower element having a layer of unidirectional carbon fiber reinforced thermoplastic material forming a lower weld zone.

6. The aerostructure of claim 5 wherein the second skin is connected with the lower elements of the ribs and spars.

7. The aerostructure of claim 1 wherein the insulating elements are configured such that thermoplastic of the first through fourth plies are maintained below a melting temperature when the fifth ply is heated to a temperature above the melting temperature by an induction welding head.

8. The aerostructure of claim 1 wherein the thermoplastic of the fifth layer has a melting temperature and the insulating elements are configured to impede heating of the second and third layers above the melting temperature when the fifth laminate is exposed to an electromagnetic field sufficient to raise a portion of the fifth laminate above the melting temperature.

9. A composite aerostructure, comprising:
a plurality of longitudinally elongated spars;
a plurality of elongated ribs connected with the plurality of spars to from a grid;
a composite skin, comprising:
  a plurality of structural layers, each formed of carbon fiber reinforced thermoplastic laminae;
  a plurality of insulating elements formed of electrically insulating material, wherein the insulating elements form a plurality of insulating grids wherein the insulating grids are aligned with one another and wherein the insulating grids are disposed between the structural layers;
  a weld layer formed of carbon fiber reinforced thermoplastic lamina;
a plurality of connecting elements comprising a layer of carbon fiber reinforced thermoplastic material, wherein each connecting element is connected with one of the spars or one of the ribs;
wherein carbon fibers of the weld layer are oriented in a first direction and carbon fibers of the connecting elements are oriented in a second direction transverse the first direction;
wherein the weld layer overlies and is connected with the connecting elements.

10. The aerostructure of claim 9 wherein each insulating element comprises glass fibers embedded within a matrix of thermoplastic material.

11. The aerostructure of claim 9 wherein the insulating elements comprise a plurality of elongated spar insulators overlying the spars.

12. The aerostructure of claim 11 wherein the insulating elements comprise a plurality of elongated rib insulators overlying the ribs, wherein the rib insulators have a length that is shorter than the length of the spar insulators.

13. The aerostructure of claim 12 wherein the rib insulators span between the spar insulators without substantially overlying the spar insulators.

14. The aerostructure of claim 12 wherein the spar insulators are spaced apart from one another.

15. The aerostructure of claim 9 wherein the thermoplastic of the structural layers comprises a semicrystalline thermoplastic in the polyaryletherketone family.

16. The aerostructure of claim 15 wherein the thermoplastic of the structural layers has a melting temperature above 500 degree Fahrenheit.

17. The aerostructure of claim 9 wherein the insulating elements are configured such that thermoplastic of the structural layers are maintained below a melting temperature when the weld layer is heated to a temperature above the melting temperature by an induction welding head.

18. The aerostructure of claim 9 wherein the thermoplastic of the weld layer has a melting point and the insulating elements are configured to prevent the thermoplastic of the structural layers from melting when the weld layer is welded to the connecting elements by induction welding.

19. A composite laminate for use in an aerostructure, comprising:
a plurality of structural layers, each formed of carbon fiber reinforced thermoplastic laminae wherein the fiber direction of at least some of the structural layers is transverse the fiber direction of an adjacent structural layer;
a plurality of insulating elements formed of electrically insulating material, wherein the insulating elements form a plurality of insulating grids wherein the insulating grids are aligned with one another and wherein the insulating grids are embedded within the structural layers between adjacent structural layers in which the fiber direction of the carbon fiber layers are transverse;
a weld layer formed of carbon fiber reinforced thermoplastic lamina.

20. The composite laminate of claim 19 wherein the carbon fiber reinforced thermoplastic laminae comprise unidirectional carbon fiber reinforced thermoplastic laminae.

21. The composite laminate of claim 19 wherein the insulating elements comprise a plurality of elongated second insulators wherein the second insulators have a length that is shorter than the length of the first insulators.

22. The composite laminate of claim 21 wherein the second insulators span between the first insulators without substantially overlying the first insulators.

23. The composite laminate of claim 22 wherein the first insulators are spaced apart from one another.

24. The composite laminate of claim 19 wherein the grid formed of the plurality of insulating elements comprises a plurality of openings.

25. The composite laminate of claim 19 wherein the structural layers comprise a plurality of pairs of unidirectional carbon reinforced thermoplastic layers, wherein each of the pairs comprise adjacent overlying layers in which the fiber direction of the carbon fibers is substantially parallel.

26. The composite laminate of claim 25 wherein one of the grids of insulating elements is disposed between adjacent pairs of structural layers.

* * * * *

Disclaimer

10,449,749 - Mark A. Calder, Midlothian, TX (US); John F. Ellis, Carrollton, TX (US); William David Dennison, Grapevine, TX (US); Martin A. Wimmer, Colleyville, TX (US); Earl L. Stone, III, Arlington, TX (US). Patent date October 22, 2019. Disclaimer filed June 28, 2022, by the assignee, Qarbon aerospace (Foundation), LLC.

I hereby disclaim the following complete claims 1-26 of said patent.

*(Official Gazette, November 1, 2022)*